INVENTOR.
Paul J. Graybill

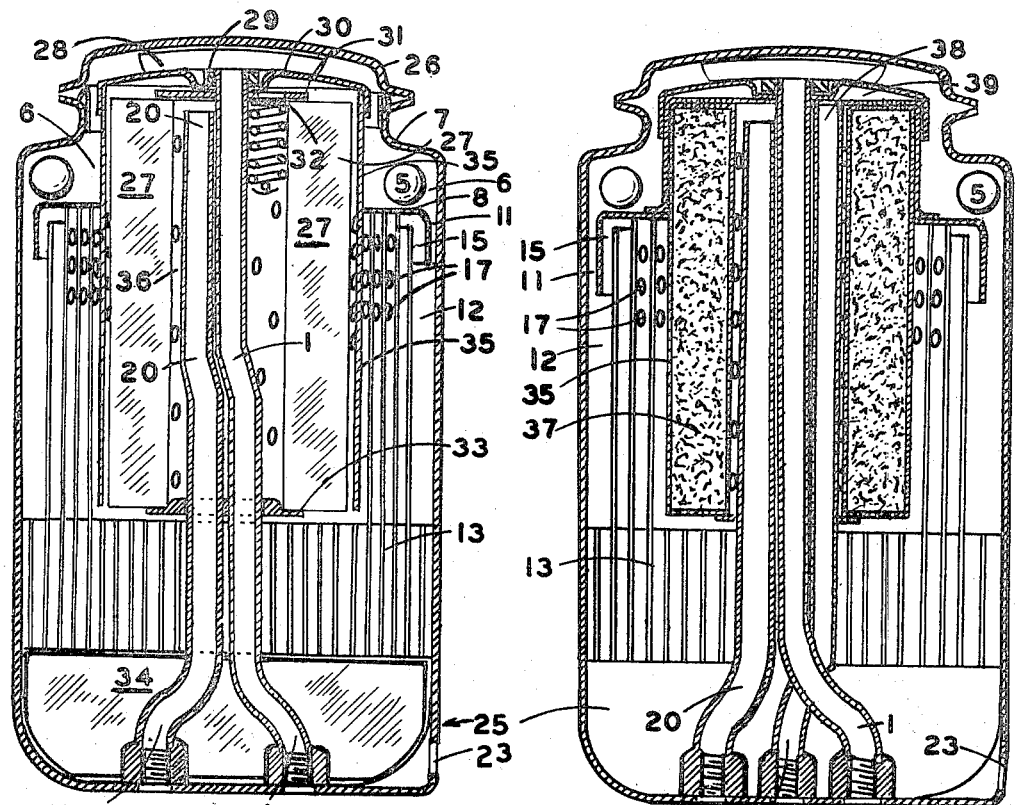
FIG.2
FIG.3
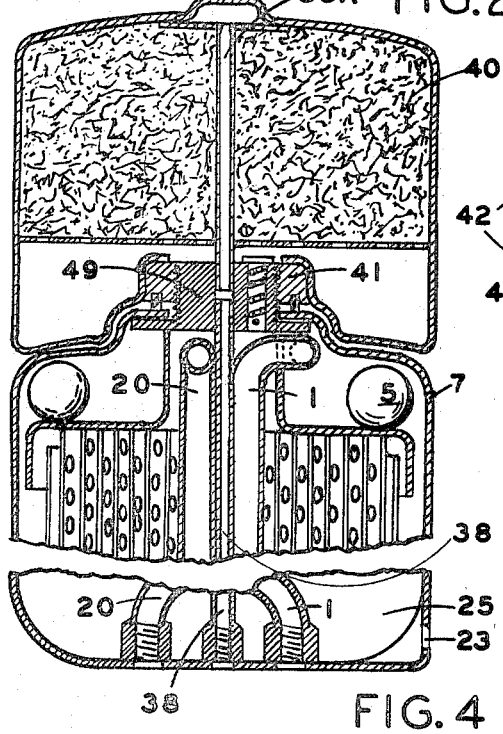
FIG.4
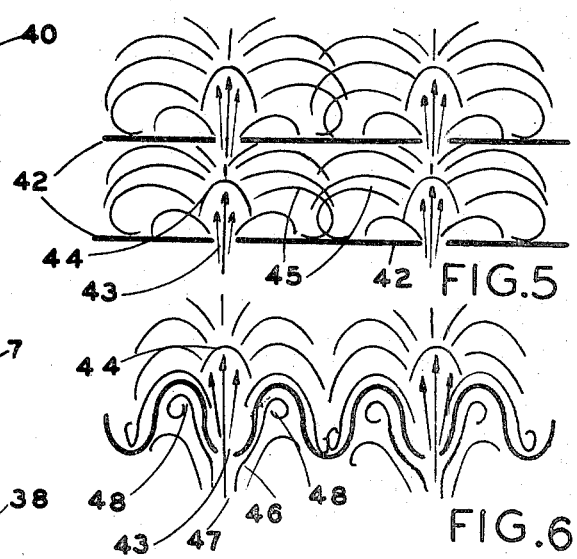
FIG.5
FIG.6
INVENTOR.
Paul J. Graybill United States Patent Office 3,529,719
Patented Sept. 22, 1970

3,529,719
OIL RECTIFIER APPARATUS AND PROCESS
Paul J. Graybill, 61 Sunset Hill Drive,
Pine Orchard, Conn. 06405
Filed June 18, 1969, Ser. No. 834,340
Int. Cl. B01d 17/00
U.S. Cl. 210—73                    16 Claims

ABSTRACT OF THE DISCLOSURE

A rectifier with process for treating contaminated liquid emulsions, including lubricating oil, in use in motors, employing several physical functiosn and chemical processes in one environment, using various metals and alloys as fixtures to neutralize acid and molecular water, catalyze gums, resins, sulphur, and various carbonaceous contaminants, electrostatically ionize and attract adsorbent colloids, separate solid contaminants and globular water by sedimentation, centrifugal and inertial forces, in laminar, parabolic and jet flow streams, to agglomerate sub-micronic contaminants by the Van der Waals effect, the Brownian movement and gravitation, thus separating the dispersed phase from the continuous phase thereof.

RELATED APPLICATIONS

This application discloses certain improvements and variations on my apparatus, with process, disclosed in previous applications Ser. No. 167,848 filed Jan. 22, 1962, now abandoned, for "Oil Cleaning Devices," which application was continued in part in my application No. 381,080 of July 8, 1964, now abandoned, which was further continued in part in my application No. 686,055 of Nov. 28, 1967 for "Oil Cleaning Apparatus and Process" which has now issued (June 17, 1969) as Pat. No. 3,450,264.

This instant application adds to the previous structures and processes (1) a horizontally oriented doughnut shaped sweep chamber, (2) a series of large area metal catalysts of various combinations, as well also (3) a variety of metallic alloy balls, (4) perforated baffle attractors with jet flow action, and (5) a combination of reverse flow baffles, also (6) as an option a secondary clarifier either externally or internally positioned therewith, as well also, as a second alternative, (7) an internally positioned, down-stream, full-flow, replaceable, sand-screen, which screen is deployed to trap large micron contaminants on the first pass before they enter the moving parts of the motor in situations where ingestion of sand is a problem.

BACKGROUND OF THE INVENTION

The cleaning of industrial fluids including motor oils has always been a major problem in industry and transportation. Creating and maintaining motor oil in use, with good lubricating quality, is perhaps the most difficult and complicated problem in internal combustion motor history. Excellent oils have been developed and appropriate additives have been used to help overcome many of the problems involved. A great number of devices have been developed, these based on centrifugal action, sedimentation, and/or porosity, the latter being the most significant in practical use. None of these have been highly successful.

Centrifuges are especially impractical since they are largely by-pass oil cleaners and allwo the major portion of the oil to go directly into the motor on each recirculation without being cleaned. This by-passing is especially true on cold starts when a by-pass valve opens and allows most of the oil to go directly to the motor without filtration. Centrifuges are also costly to install and maintain, since they have to be powered by pully or otherwise and since they have to be frequently dismantled and cleaned, hence as a consequence of these shortcomings, they have not been generally used.

Sedimentation, sink tanks, or chambers are generally too large for practical purposes and also have not been used extensively on vehicular motors.

Porous strainer type filters of various types such as edge type filters, sintered metal filters, conglomerate filtering media filters (these usually used as by-pass filters), and especially pleated paper media filters have been widely used, but since all of these are based on porosity for the cleaning process, they fall far short of being adequate, since if the porosity is fine enough to remove contaminants down to the required 2–5 micron level, they create considerable back pressure and they also clog readily and then of course by-pass the greater portion of the oil, through a relief valve, directly to the motor again without filtration. This clogging, by creating back pressure, tends to rob the motor of sufficient oil for proper lubrication, hence valve noises and motor failures etc.

Most of such available filters are not five micron filters; they do not go below the 10–40–100 micron level and are therefore of little value since it is the 5–10 and the 10–40 micron abrasives that cause most wear in any motor. Contrast this with the instant apparatus which removes all contaminants above 3 microns in size and most of them above ½ micron in size.

The edge type filter cannot generally remove particles below 40–100 microns in size and are therefore the least desirable for vehicular use. These edge type filters require continuous or intermittent sweeping of the edges to remove captured contaminants and since these dislodged contaminants are not actually removed from the flow stream but are merely swept off the edge of the filter into the oil, they are as a consequence immediately recirculated into the filter, causing reclogging.

Sintered metal filters, although they remove particles down to 5–10 microns, in some instances, are quickly clogged and require frequent cleaning with a solvent. They also readily create back pressure when clogged and are not in general use.

Conglomerate filtering media filters are widely used but only as by-pass filters in conjunction with filters of other types, used alone they are not adequate since the large portion of the oil recirculates without filtration.

Pleated paper filters which are widely used rarely remove particles below 15 microns in size, those that do go below this level clog readily and they then by-pass most of the oil on each recirculation. Their active life is indeed short, their capacity limited, and their effectiveness in micron size is disappointing.

In reality the porous filter is very limited in its usefulness in removing abrasive material and further they cannot remove any large amounts of the sub-micronic contaminants which are formed in the combustion cycle. These very minute particles are, of course, the most important contaminants of all since, they are the cause of the carbon deposits and the build-up of gums and resins and other contaminating materials which when not removed, neutralized, or otherwise destroyed, accumulate and are hardened in hot spots in the motor to form the very destructive abrasive and other materials which then if not removed down to the 2 micron level will destroy a motor. Porosity would then seem to be the wrong principle for keeping oil in good lubricating quality. The real answer would be to constantly rectify the oil sufficiently well to prevent this build-up and the formation of these abrasives in the first place. Actually if the oil is constantly being rectified the only real problem then is to prevent foreign abrasives in the air, and other sources from entering the motor since virtually no large abrasives will be created in the motor, as is true with existing systems. It should also be noted here that there are a number of important problems in maintaining good lubricating quality in oil, other than the removal of abrasives, which none of the previously considered cleaning devices are able to solve.

(1) They do not neutralize acid.

(2) They do not destroy molecular water which in itself is the chief cause of emulsification of oil and the creation of acid as well as sludge.

(3) They do not otherwise prevent the formation and accumulation of sludge in the motor.

(4) They do not remove globular water in volume.

(5) They do not catalyze gums and resins, or assist in preventing their formation.

(6) They do not cool the oil, thus do not in this way assist in the prevention of the formation of gums and resins.

(7) They do not prevent the passing of the circulating oil through a porous contaminated medium with the attendant danger of bursting the medium and/or picking up agglomerated contaminants and fibers, which contaminants are then forced directly into the working parts of the motor.

(8) They do not effectively prevent excessive wear in the motor with the resultant frequent overhauls.

(9) They do not improve the quality of the oil by a continuous re-refining process adding to its viscosity, its oiliness, its greasiness, its film strength, and its resistance to heat.

(10) They do not increase the horsepower of the motor or improve the consumption rate of fuel.

(11) They do not prevent the greater portion of the blow-by from the combustion chamber and consequently the pollution of the air.

(12) They do not extend the life of a motor perhaps as much as 100–200% as does the instant rectifier.

(13) They do not supercede or prevent the periodic changing of the crankcase oil and the filters or the filter elements with their cost and labor.

It would seem then that an oil cleaner based on porosity is entirely inadequate and that an apparatus and process which would correct these shortcomings would do exactly what porous filters fail to do (except trap certain contaminants) and would not do what porous filters do. In fact, porous filters perform exactly contrary to the way an ideal oil rectifier would perform in most respects.

SUMMARY OF THE INVENTION

With that in mind the instant rectifier and process was developed over a period of years employing any and all physical and chemical functions and processes which would obviate the shortcomings of the porous filters and accomplish the desired results of the porous filters and more positive ways, consequently an adequate liquid tight apparatus was developed having appropriate fixtures properly housed within one environment, through which contaminated oil could be forced performing the previously mentioned functions and processes sufficiently well to keep the oil in good lubricating quality without using porosity of any type and without the required replacement of parts (with the exception of the sand screen when it is used) and without the complete changing of oil but instead with the gradual oil change, the draining of sludge from the sump of the apparatus up to 20–30 or more percent of the crankcase capacity, this depending on the type of operation, thus removing these accumulated contaminants and then replacing this amount, plus the oil used in the interim, with new oil which is added to the crankcase of the motor; this schedule being predetermined and based on oil sampling and testing. This, then, would seem to be the ideal answer to the problem of maintaining oil with good lubricating quality. In reality this is a new approach to lubrication control; that is, draining the worst and adding the best and allowing the motor to build up the quality of the retained oil to get the most benefit from this super refined oil, in short it is substituting the practice of the gradual oil change for the current practice of complete change of oil and filters.

These and other advantages will be better understood when reference is made to the following drawings and descriptions.

BRIEF DESCRIPTION OF THE DRAWINGS

Here in simple disclosure is presented a number of drawings which illustrate the rectifier, its apparatus and processes.

FIG. 2 is a cross-sectional view of a variant form of the rectifier with a removable lid and an internally positioned and removable down-stream, full-flow sand-screen, FIG. 3 is likewise a vertical cross-sectional view of a similar rectifier with an internally positioned removable down-stream by-pass conglomerate media filter-type clarifier therein, FIG. 4 is a vertical medially cross-sectional partial view of a third variant of the rectifier having a disposable outwardly articulated screw-on by-pass secondary conglomerate media-filter-type clarifier.

FIG. 5 is a schematic view of two adjacent perforated attractor baffle plates showing the parabolic jet stream flow pattern useful in separating heavy contaminants, FIG. 6 is also a schematic view of a portion of a perforated and corrugated attractor baffle plate which may be used as an alternative in the configurations of FIGS. 1, 2, 3, and 4 showing the jet stream action with parabolic flow and the baffle surface contacting action for separating contaminants from the flow-stream.

DETAILED DESCRIPTION OF RECTIFIER, APPARATUS AND PROCESS

Figure 1:
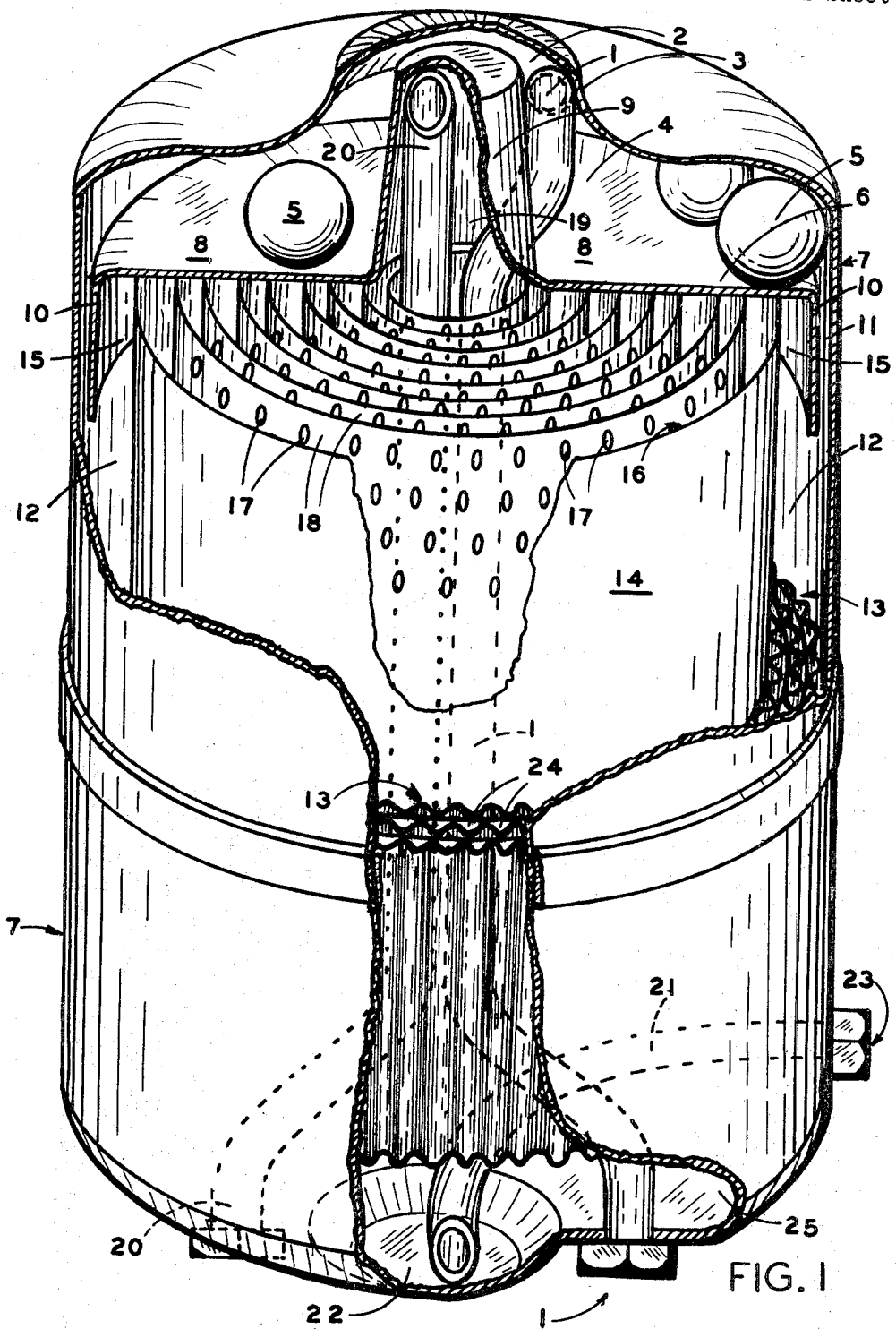
FIG. 1 is a vertical cutaway perspective view of the oil rectifier of this disclosure in its simplest structure.

Referring then to the drawings FIG. 1 is a vertical cutaway perspective view of my improved oil rectifier in its simplest structure. Oil under pressure enters inlet pipe 1, flows upwardly therethrough to anti-drainback chamber 2, which is formed as a bubble configuration in the upper lid portion of casing 7, where the oil escapes tangentially to the vertical wall 3 of said anti-drainback chamber 2, and by virtue of its rapid flow rate it is swirled about the inside of said chamber 2 setting up circular movements in the larger circulating chamber 4 which movements carry metallic alloy balls 5 about ball race 6 which ball race 6 is bounded by pressure tight casing 7 on its upper and outer walls, by ball race floor 8 on its bottom wall. Ball race 8 is integral with outlet shield cone 9 which is centrally positioned therein and forms the inner wall of ball race 6. Reverse-flow baffle 10 which is articulated downwardly from outer periphery of ball race floor 8 creates with casing 7 down-flow channel 11 through which the pressured oil flows downwardly and circularly into doughnut shaped vertical circulating chamber 12 in a laminar flow action. Doughnut shaped circulating chamber 12 is bounded on its bottom by honeycomb-like foraminous partition 13, which partition is fully cross-sectional in casing 7. Chamber 12 is bounded on the outer periphery by casing 7 and on its inner periphery by unperforated circular shield 14, said oil then laminarly rotates slowly about said vertical circular chamber 12 enabling water and large contaminants to settle downwardly through said honeycomb 13. The oil then makes a 180° turn to flow upwardly in upflow channel 15 to overpass unperforated circular shield 14. It then again makes a 180° turn to flow downwardly into adjacent channel 16 from whence it is forced through the multiple perforation 17 in the numerous circular attractor baffles 18 where parabolic flow streams 44, FIG. 5 are set up at each perforation, these perforations being deployed to encourage the dislodging of contaminants as well as to encourage flow contact with all of the surface areas of said attractor baffles 18. Said oil finally enters central channel 19 where it passes upwardly in outlet shield cone 9 to enter and pass through outlet tube 20 into the oil system of the motor The perforated circular attractor baffles 18 may be made of corrugated material (not shown but illustrated in FIG. 6). This perforation and corrugation increases the efficiency of the attractors by providing natural eddying of the flow-stream and increased contact with the surfaces of the baffle attractor plates. This flow action is much slower than the jet-streams themselves and prevents severe washing action on the baffles thus encouraging electrostatic attraction and cohesion of small micron contaminants to the walls thereof. Settling contaminants, either free flowing or surface settling from the attractor baffles, pass into and through the foramina 24 of honeycomb partition 13 into sump 25 where they accumulate for either periodic or gradual and continuous draining through drain-tube 21. Drain-tube 21 is positioned between the extreme bottom, bubble 22, of casing 7 to outlet 23. Oil-flow for draining is activated by the pressure of the oil pump of the motor when an articulated valve (not shown) is opened at said outlet 23.

To recapitulate briefly, as previously stated, the entering oil is rotarily circulated in a sweep chamber and ball race contacting and moving a multiple number of catalystic and corrosive metallic alloy balls and is then circulated by laminar flow in a doughnut shaped circulating chamber and is reverse flowed under and over a series of staggered baffles and then forced through a number of perforations in a number of concentric attractor baffles thus setting up parabolic flow patterns, after which it is then forced upward to enter the outlet tube where it returns to the motor.

During this operation a number of basic physical and chemical processes and functions are transpiring, the essential ones being centrifugal force, catalytic action, corrosive action, neutralization, electrostatic attraction, cohesive bonding, sedimentation, inertial force in reverse flow patterns, parabolic flow, laminar flow, the Van der Waals effect and agglomeration, some of these being assisted by the molecular action of the Brownian movement.

To further recapitulate more specifically and in more detail, oil containing contaminants is forced to flow into and centrifugally and laminarly within said apparatus among a variety of internal fixtures, such as flow tubes of certain metallic composition, these to act also as heating elements, a swirl plate or any other device of certain metallic composition, this to create acute centrifugal flow, a ball race of certain metallic composition with numerous metallic alloy balls of various composition floating therein, these to be self-cleaning because of their movement within the race, and so deployed to neutralize acid and water, and to assist in catalyzing gums, resins, and other contaminants; an essentially vertical doughnut shaped circulating chamber within which liquid is centrifugally and laminarly circulated to increase dwell time and encourage the separation of heavy contaminants, at least one set of staggered vertically oriented baffles of certain metallic compositions to abruptly reverse in an 180° turn said flow stream, this to assist in dislodging heavy contaminants by inertial force, a multiple number of perforated concentric baffle attractor plates of certain composition, to afford maximum surface exposure to enhance the electrostatic attraction, catalytic action and ionic neutralization of said ionized colloids, also as well, to provide jet flow patterns therethrough to create a multiplicity of small pattern laminar flow streams with parabolic profile to insure further separation of heavy contaminants by virtue of said parabolic flow pattern, also to insure complete flow coverage of the attractor baffles, all of these fixtures being positioned above an essentially medial, fully cross-sectional, honeycomb like, foraminous partition in said apparatus through which vertical foramina settling contaminants may pass into a lower sump in said apparatus to accumulate for final removal by draining.

Thus by the processes of centrifugal force, parabolic jet and laminar flow action, inertial action resulting from complete reversal of the flow stream, electrostatic attraction, catalytic and corrosive action resulting from the exposure in certain sequence of said oil to large surface areas of various metals and metal alloys, flocculation, coalescence, the Van der Waals effect, and sedimentation, all of these acting together with the Brownian movement, said contaminants are catalyzed, neutralized, flocculated, and separated by electrostatic attraction, coalescence, and sedimentation, and are subsequently trapped by passing through said foraminous partition into said lower sump where they accumulate for final disposal by an either continuous or periodic drain stream.

FIG. 2 is a cross-sectional view of a modilcation of the apparatus of FIG. 1, in this case a removable access lid 26 has been added to casing 7 to facilitate the removal of sand screen 27 which screen can be of any suitable screening material. The removal is possible when swirl plate 28, restrictor nut 29, cover 30, and by-pass plate 31, which has by-pass valve 32 articulated thereto, have been removed. Sand screen 27 is clamped between by-pass plate 31 and platform 33, which platform is articulated to inlet tube 1 and outlet tube 20. Sand screen shield 35 which is perforated on its upper portion is articulated to ball race bottom 8, its function is the protection of said sand screen 27 and the partial formulation of ball race 6. A radiation baffle plate 34 is integral with tubes 1 and 20 to prevent major movement in the oil in sump 25 by transversing its complete cross-section, this plate also acts as a radiation fin to assist in warming the oil in said sump.

Otherwise the formulation of FIG. 2 (with slight modifications) is similar to that of FIG. 1, and needs no further detail description. In short, the apparatus of FIG. 2 is essentially the same as that of FIG. 1 except that it has the centrally and upwardly positioned sand screen 27 therein to assure the removal of large contaminants on the first pass since all the oil must pass therethrough.

Oil entering inlet tube 1 flows upward and is put into acute centrifugal motion by swirl plate 28 passing and swirling into ball race 6 and subsequently as previously described into doughnut shaped vertical circulating chamber 12 through channel 11 hence upwardly through channel 15, through perforation 17 and on through perforated sand screen protector shield 35, through sand screen 27 (unless sand screen is clogged in which case through by-pass valve 32) into central chamber 36 where it rises and enters tube 20 to return to the motor. Large particles of sand and other debris are trapped on said sand screen 27 and when dislodged may migrate downward into and through honeycomb foraminous partition 13 into the sump to be removed. All other aspects of the operation and processes of the configuration of FIG. 2 are essentially identical to that of FIG. 1. When said screen 27 becomes clogged it may be removed and replaced, this clogging is indicated by a ten pound drop in the oil pressure.

FIG. 3 is a cross-sectional view of the second type of modification of the configuration of FIG. 1. In this case a conglomerate filter-medium 37 is employed and positioned exactly as the sand screen of FIG. 2. In this case no by-pass valve is necessary since filter 37 is mounted as a by-pass filter itself, but in this configuration a by-pass tube 38 is necessary. This tube returns the filtered oil directly back to the crankcase of the motor after it has passed through filter 37 and upwardly through return chamber 39 into said by-pass tube 38. At regulated intervals this filter medium may be changed as is the sand screen, however no change of pressure can be noted. This configuration is useful in only certain applications.

FIG. 4 is a cross-sectional view of another modification of the configuration of FIG. 1. In this case a screw-on conglomerate filter 40 is mounted on the upper portion of the structure of FIG. 1. This likewise is a by-pass filter medium with return tube 38 and 38A through which the filtered oil is returned directly to the motor. Likewise the operation is essentially identical to that of FIG. 3. An adaptor plate 49 is provided in the upper portion of casing 7 of FIG. 4 into which conglomerate filter 40 is secured by means of an incorporated screw-on plate 41. The essential functions of the configuration of FIG. 1 are here employed with the addition of the secondary clarifier in the form of conglomerate filter 40. About 10% of the circulated oil passes through the clarifier with the other 90% performing exactly as it would in FIG. 1. Filter 40 is only supplemented for use in certain cases where the contaminants are difficult to remove by the process of FIG. 1 alone.

FIG. 5 is a schematic drawing of the parabolic jet flow action through a series of perforated plates 42. This illustrates the action of fluid as it flows through a jet into an area likewise filled with fluid. As fluid flows through jet 43 it creates a parabolic pattern 44 in its laminar flow with side swirls 45, which swirls insure surface contact over the entire area of said plate 42. This action is mild and does not create a strong washing action thus allowing electrostatic and cohesive attraction and the bonding of contaminants that come in close contact with plate 42. Contaminants that are large enough o be fricionally engageable by the movement of the oil in a laminar flow-stream are shunted to the outside away from the parabolic profile and are then brought in close contact with the plates where they are attracted and held. When these perforations are used as in FIGS. 1, 2, 3, 4 the contaminants build up on said surfaces until they become heavy and since they are held in loose relationship the outer portion of said layer gradually drifts downward into honeycomb 13 and sump 25 where they cannot be retrieved or come in contact with the flow stream, of the oil. This attraction and build-up takes place even when the oil is not in major motion, as when the motor is not running, since the molecular movement in the oil continues to move particles about in small patterns. Therefore sooner or later any contaminant is brought in close contact with the surface of the attractors where it may cohere. This molecular action is known as the Brownian movement. The Van der Waals effect also aids in this action. It consists of imbalanced polarization of the atoms in the contaminants and the subsequent attraction and cohesion of these contaminants into larger agglomerates including their attraction to the captured contaminants on said attractor plates.

FIG. 6 likewise is a schematic drawing of the same process when corrugated attractor plates are used. The perforations 43 are situated at the near apex of the corrugation, and when oil is forced through said perforations a double set of very useful swirls is created. The trailing flow of oil 46 following the central flow-stream 47 is shunted about the adjacent corrugation valleys 48 in a smooth non-washing flow which is conductive to the attraction and cohesion of contaminants. The same action occurs after the parabolic flow stream 44 establishes itself after passing through perforation 43. Here again there is smooth complete contact coverage of the surface of the adjacent corrugated plate. This also allows very effective action of attraction and cohesion. In the case of the use of corrugated attractor plates the cohered contaminants are sheltered extremely well and can settle downwardly without ever being picked up again in the flow stream, for in every instance they do not come in contact with such a stream.

It can be readily seen that oil, having contaminants therein, when severely lashed about in the motor will create a washing action preventing the lodging of contaminants and will also pick up contaminants that may be present and then that same oil when exposed to the much greater attractor surfaces of the rectifier (as much as 700% greater) but in a very slow action with extended dwell time, will deposit both by sedimentation and attraction the same contaminants that it had previously picked up, this action being assisted by the fact that the frictionalizing of the small micronic particles, in the turbulence in the motor, creats an ionic electric charge thereon, which charge results in their natural attraction to the metal of the attractors which is of the opposite polarity. As has been stated, when these particles are attracted to and are accumulated on the surface of the attractors, they then attain aggregate weight and since they are held only in loose relationship thereto they tend to migrate downwardly into the honeycomb and sump as a result of gravitational pull and the jostling of the vehicle. These attractors are then therefore self-cleaning to a large degree.

With the exception of foreign sand and other large particles that may enter and contaminate oil, the only real source of contamination is from the combustion cycle in the motor. These particles that are there formed, such as carbon and ash are submicronic in size and are not and never will be abrasive unless they are deposited in some hot spot in the motor and hardened into large chunks of carbon. It is they, then, when they break off and migrate that are very disastrous. It is these submicronic particles that must be removed before they have an opportunity to deposit and harden into this abrasive material. Not only are these particles removed by electrostatic attraction but in the instant unit this process is further assisted by the previously mentioned Van der WWaals effect which begins the process of floccuation of these materials into larger units. The Van der Waals effect is the bunching of electrons on one side of the atom, which electrons are normally orbiting about the nucleous of the atom. This bunching creates an imbalance in the atom and since the electrons are negative and the nucleous or protron is positive there is then the establishment of definite polarity within the atom, it is negative on one side and positive on the other; which when two such imbalanced atoms come in contact the oppositely charged sides of this polarity attract and hold one another together forming a double sized particle without polarity. These neutral bodies then, being irregular in shape, when contacting other similar bodies latch thereto and hold and continue the process of floccuation, the building up of larger particles. These larger particles are also more prone to adhere to others of like nature or to the amassed conglomerates on the surface of the attractors since as these larger particles build up in size they not only settle downwardly but they also acquire properties and characteristics other than merely gaining weight. They become centers of gravitational force themselves thus still further floccuating until they are able to settle by overcoming the resistance of the increased viscosity of the oil.

This action is over and above the natural electrostatic attraction of ionized colloids previously descbribed in which each ionized bit of carbon for instance, carrying a negative charge, is attracted to steel of the opposite polarity. These processes of electrostatic attraction, floccuation, cohesion, and sedimentation are assisted by the Brownian movement even when the oil is not in major movement.

It should be noted that the whole theory of adding certain colloidalized contaminants (commonly called detergents) to oil, among other things, is to neutralize these ionized contaminants in the oil, which contaminants have been created in the combustion cycle and ionized by frictionalization in the motor. The detergent is added to prevent the cohesion of these colloids to the metal of the motor, that is, to keep them in suspension so that they may be drained with the oil at the oil changes. This is the reason oil in the average motor becomes dark. This pollution of the oil will ultimately destroy its tenacity and weaken the oil film and cause its break-down, if continued too long in use. Hence the use of detergents is the lesser of two evils but it is commonly employed.

It, however, fails to provide a long lasting super refined oil with strong cohesive bonding of the hydrocarbon chains, which add to the oil film strength, add to the viscosity, add to the resistance to heat, lower the volatility resulting in a lower flash point, add to oiliness, and to greasiness, such as is the case when the oil is kept free of contaminants and used over long periods of time as it is in the instant rectifier.

It should be further noted that when any contained acid or water comes in contact with the magnesium alloy balls in the ball race said acid or water is neutralized or destroyed by the displacement of the hydrogen atom, as an example hydrochloric acid is destroyed when $(Mg+2HCl)$ becomes $(MgCl_2+H_2)$ liberating the hydrogen and forming a precipitate. And when water contacts magnesium the results are as follows $(Mg+2H_2O)$ becomes $(Mg(OH)_2+H_2)$ liberating the hydrogen. Thus both acid and molecular water are no longer problems. Globular water is also easily handled as a sediment in the instant structure, it is removed immediately.

Still other metallic alloy balls such as manganese 30–50% with either copper 50–70% or zinc 50–70% may be used in the ball race to neutralize acid and control gums and resins. The action may be either catalytic or electrolytic, but the desired effect is achieved. These three metals, copper, aluminum, and zinc may be used as pure metals in large areas as parts built into the rectifier over which the oil must pass to accomplish the same results. As an example the ball race may be made of copper, the unperforated circular shield may be made of aluminum and the sand screen protector shield may be made of zinc to control gums and resins as well as acid. Tin may also be added in this series.

Also metallic sodium alloyed with lead 50% or tin 550% and upward with at least 20–25% metallic sodium by weight will also act as a neutralizing corrosive to destroy acid.

Likewise a series of an alloy of magnesium and aluminum and the pure metals of tin, zinc, and metallic sodium will neutralize acid and together with calcium will aid in removing other molecular hydrocarbonous contaminants. In like manner a series of, or an alloy of, metallic sodium and metallic potassium will remove or prevent the formation of sulphur in oil. Either balls of these metals may be added to the ball race or large area parts of these metals may be used in the rectifier, but in either case effective control of these contaminants is possible.

To be more specific as examples: magnesium, aluminum, and tin may be used in an alloy to neutralize acid and water, or manganese and copper or manganese and zinc or metallic sodium and lead may be used as alloys to neutralize acid and control gums and resins, also metallic sodium and metallic potassium to control sulphur; also the apparatus itself may be constructed to contain 2 or 3 or more of these pure metals so deployed as metal parts in the internal structure thereof to perform some of these processes, as an example; said inlet and outlet tubes may be of aluminum, said ball race floor of copper, said unperforated circular shield of zinc, said concentric attractor baffles of tin to control acid, gums, and resins.

In use after the initial filling of the unit, the oil is in continuous circulation therethrough as long as the motor is in operation, the complete crankcase volume passing through about every thirty seconds in a full flow system, with all the various actions and reactions previously described continuously taking place, thus continually processing the oil.

In normal operation after the first few minutes, the oil becomes hot which drastically reduces the viscosity thereof and greatly accentuates molecular movement in the oil, this hot oil is then entering inlet flow tube 1 and passing out flow tube 20 where by conduction and radiation it heats the non-circulating oil in the foraminous partition and sump which heating greatly facilitates the processes of the unit by allowing freer passage of settling contaminants through this thinner and more molecularly active oil as stated in Stokes formula on sedimentation.

It should be also noted that even when the motor has stopped this complete cleaning action continues throughout the unit, sedimentation continues, the downward travel of coalesced colloids on attractors and on the walls of foraminous partition also continues, and the neutralization of acid on corrosive balls as well as the electrostatic attraction of colloids to the attractors also continues, this as a result of the movement of oil in small patterns due to molecular action (Brownian movement) about which all parts of the oil are ultimately brought into contact with said elements and attractors. This continued cleaning process, even while the major movement in the oil has stopped, is very important since most motors are idle a great part of the time and since this action cleans much of the oil in the unit in any such period as over night for instance. This cleaned oil is then immediately forced back into the motor when the motor is started, as it is replaced by oil from the crankcase. This operation is repeated each time the motor is stopped for any length of time thus continuously cleaning and recleaning that part of the contained oil.

The conglomerate formed in the sump is finally periodically purged by pressure through the evacuating means while the motor is running, this drained oil with whatever oil is used in the interim in the combustion cycle is then replaced by new oil which is added to the crankcase. Hence the repeated circulation of the oil through the instant apparatus with these processes continually taking place, whether the motor is running or not, keeps the oil in good lubricating quality at all times.

The result is a clean super refined oil which oil has actually acquired several added qualities it did not have as new oil. It has more oiliness, it has higher viscosity, it adheres more tenaciously to metal surfaces, it has greater film strength, it resists higher heat and heavier loads before breaking down, it maintains a thicker oil film thus preventing abrasion, it prevents blow-by in the combustion chamber and it is less volatile since all volatile materials have long since been burned out, thus it reduces smog and prevents exhaust smoke as well as reduces the amount of oil actually consumed in the combustion cycle. The result is an oil of high lubricating quality which prevents wear in the motor and greatly adds to fuel efficiency because of higher compression which results in more delivered horsepower and more miles per gallon of fuel. The draining schedule is determined by tests of the viscosity, the total contaminate content, and the dilution factor. Viscosity should not be allowed to increase more than 50–60% above that of the new oil used. Total contaminants even though they are below 3 microns in size should not go above 2%. Dilution should not go above 3%. Any knowledgeable operator can soon learn to judge the condition of the oil by simple tests or even by the dip stick and can alter his draining schedule.

The ultimate result then is an oil of high lubricating quality which prevents unnecessary wear, thus lengthening the life of the motor, and materially adding to fuel efficiency.

The features of the instant apparatus and processes are new, novel, and useful, they constitute a decided advance in the treatment of lubricating oil. These features used in toto or in part or in various sizes and different arrangements or with altered parts serving the same purpose, are within the spirit of this invention. The embodiments shown do not limit the broad features of the apparatus and processes claimed, but are only exemplary and other embodiments including modified forms of these essential parts and processes may be resorted to without departing from the spirit of my invention or the scope of the subjoined claims.

I claim:

1. A liquid rectifying apparatus for the catalyzing, neutralizing, trapping, and finally removing or otherwise destroying the dispensed-phase from the continuous phase of a contaminated liquid dispersion, particularly lubricating oil in use in a motor, said dispersed-phase consisting of both soluable and insoluable contaminants such as sand, dirt, metal particles, carbon, acid, sulphur, gums, resins, ash, water, coolant, and other foreign materials of molecular and larger sizes all of which are widely dispersed in said oil and part of which are ionized, said apparatus comprising:

a generally cylindrical pressure tight housing having a generally vertically extended longitudinal axis, an essentially medial fully cross-sectional honeycomb-like foraminous partition horizontally oriented in said housing, said foraminous partition being comprised of essentially non-porous material having said foramina essentially vertical therein and cooperating with the upper portions of said confined area in said housing to define generally an upper fully cross-sectional circulating area and with the lower portion of said confined area in said housing to define a bottomly positioned fully cross-sectional sludge sump, said foramina being so deposed as to allow settling contaminants therethrough moving from said circulating area into said sump;

inlet means mounted in said housing for introducing contaminated oil into said circulating area, said inlet means disposed so as to establish whirling flow of said oil within said circulating area to generate forces for displacing said heavy contaminants generally outwardly within said circulating area;

a series of concentric attractor baffles extending upwardly from said foraminous partition at least part way into said circulating area, at least part of said baffles having perforations therethrough, said baffles defining impingement surfaces for said coarse or ionized colloidal contaminants to facilitate the separation by sedimentation, electrostatic attraction, and cohesive bonding of said contaminants;

a doughnut shaped circulating chamber positioned about said concentric attractor baffles being defined by said baffles on its inner limits, by said housing on the outer and upper limits and said foraminous partition at its lower limits;

outlet means mounted in said housing generally centrally of said circulating chamber for removing said continuous phase oil after the separation of said dispersed-phase contaminants;

said sludge sump for receiving said settling contaminants after they have passed through said foraminous partition; and draining means in said housing in said sump area to facilitate the removal of said contaminants.

2. The apparatus as claimed in claim 1 also having a centrally located anti-drainback chamber in the top wall of said housing being formed as a bubble and extending upwardly from said top wall thereof.

3. The apparatus as claimed in claim 2 also having inlet and outlet flow tubes positioned fully between the housing of said sump to the exact top of said anti-drainback chamber thus preventing any appreciable drainback of said liquid when the system is not in operation since both the outlet and the inlet tube terminals are well within the confines of said anti-drainback chamber.

4. The apparatus as claimed in claim 3 also having a ball race positioned immediately below the upper wall of said housing and said drainback chamber said race being defined on its lower limits by a floor, said floor being positioned firmly on the upper edges of the said concentric attractor baffles, said ball race being defined on its inner limit by an articulated outlet shield cone which extends upwardly therefrom to the exact top of said anti-drainback chamber, said shield being so deposed as to prevent said oil from entering said outlet tube until it has been forced about said ball race bottom, a reverse flow baffle, the upper edge of an unperforated circular shield and through the perforations in said concentric attractor baffles from which point it then flows upwardly in said outlet shield cone to said outlet tube, said ball race also having a multiple number of self cleaning metallic alloy balls of varying compositions positioned therein to catalyze and neutralize any contained contaminants on contact therewith as they are circulated about by the centrifuging oil therein.

5. The apparatus as claimed in claim 4 also having the reverse flow baffle articulated to the outer periphery of said ball race floor and extending part way downwardly into the doughnut shaped circulating chamber about which reverse flow baffle said oil is forced to flow in an 180° turn as it rotarily circulates in said circulating chamber in a laminar flow pattern.

6. The apparatus as claimed in claim 5 also having said unperforated circular shield positioned as the outside member of said attractor baffles said circular shield extending upwardly from said foraminous partition to a point just short of the floor of said ball race thus forming a staggered series of baffles and forcing another 180° turn in said liquid flow as it proceeds upwardly between said reverse flow baffle and said non-perforated circular shield and then downwardly between said non-perforated shield and the adjacent perforated attractor baffle.

7. The apparatus as claimed in claim 6 in which said metallic alloy balls may consist of two or more metals of many combinations using such metals as magnesium, aluminum, tin, zinc, copper, metallic sodium, metallic potassium, lead, magnesium, and calcium.

8. The apparatus as claimed in claim 7 having a throw away type conglomerate filter articulated by screw threads to an adaptor plate positioned in the upper wall of said casing, said conglomerate filter also having a by-pass tube returning the filtered oil directly back to the crankcase of the motor.

9. The apparatus as claimed in claim 7 having a steel casing, aluminum inlet and outlet tubes, a copper ball race, tin concentric perforated baffles, magnesium, lead and aluminum alloy balls, manganese and zinc alloy balls, metallic sodium and lead alloy balls, manganese and copper alloy balls, these balls selectively deployed to control, neutralize, or catalyze gums, resins, sulphur, acid, and molecular water.

10. A liquid rectifying apparatus for the catalyzing, neutralizing, trapping, and finally removing or otherwise destroying the dispersed-phase from the continuous phase of a contaminated liquid dispersion, particularly lubricating oil in use in a motor, said dispersed-phase consisting of both soluable and insoluable contaminants such as sand, dirt, metal particles, carbon, acid, sulphur, gums, resins, ash, water, coolant, and other foreign materials of molecular and larger sizes all of which are widely dispersed in said oil and part of which are ionized, said apparatus comprising:

a generally cylindrical pressure tight housing having a generally vertically extended longitudinal axis, an essentially medial fully cross-sectional honeycomb-like foraminous partition horizontally oriented in said housing, said foraminous partition being comprised of essentially non-porous material having said foramina essentially vertical therein and cooperating with the upper portions of said confined area in said housing to define generally an upper fully cross-sectional circulating area and with the lower portion of said confined area in said housing to define a bottomly positioned fully cross-sectional sludge sump; said foramina being so deposed as to allow settling contaminants therethrough moving from said circulating area into said sump;

inlet means mounted in said housing for introducing contaminated oil into said circulating area, said inlet means disposed so as to establish whirling flow of said oil within said circulating area to generate forces for displacing said heavy contaminants generally outwardly within said circulating area;

a series of concentric attractor baffles extending upwardly from said foraminous partition at least part way into said circulating area, at least part of said baffles having perforations therethrough, said baffles defining impingement surfaces for said coarse or ionized colloidal contaminants to facilitate the separation by sedimentation, electrostatic attraction, and cohesive bonding of said contaminants;

a doughnut shaped circulating chamber positioned about said concentric attractor baffles being defined by said baffles on its inner limits, by said housing on the outer and upper limits and said foraminous partition at its lower limits;

outlet means mounted in said housing generally centrally of said circulating chamber for removing said continuous phase oil after the separation of said dispersed-phase contaminants;

said sludge sump for receiving said settling contaminants after they have passed through said foraminous partition; and draining means in said housing in said sump area to facilitate the removal of said contaminants;

a sand screen having a centrally oriented chamber therein so positioned in said housing as to encircle the upper portion of said flow tube and be there securely mounted between an upper by-pass valve plate and a lower platform articulated to said flow tubes, said sand screen so deployed that all of said liquid flow must pass therethrough before reentering said outlet tube, said outlet tube being positioned in the centrally oriented chamber of said sand screen, said sand screen also having a circular protection shield thereabout which shield is partially perforated to allow the passage therethrough of said circulating oil, said protection shield forming the inner wall of said ball race being positioned inwardly from said perforated attractor baffles said shield also having a close fitting cover secured thereto, closing its upper end.

11. The apparatus as claimed in claim 10 having a by-pass valve mounted through said by-pass valve plate so deposed and pretensioned to open and let oil pass therethrough when sand screen is clogged, said by-pass valve extending downwardly into the central chamber of said sand screen.

12. The apparatus as claimed in claim 10 having a removable access lid centrally located in the top wall of said housing, said lid to be removable when said sand screen in replaced.

13. The apparatus as claimed in claim 12 having a centrally located swirl plate positioned about the terminal end of said inlet tube between said cover and said access lid so deployed as to give acute centrifugal action to said entering oil.

14. The apparatus as claimed in claim 13 having a fully cross-sectional radiation baffle plate integral with the lower portion of said inlet and outlet tubes, this so deployed as to fully cross said sump and stop the movement in and also to heat the oil in said sump.

15. The apparatus as claimed in claim 14 having a spool shaped conglomerate type filter positioned therein instead of said sand screen, also having a by-pass tube replacing the by-pass valve, said tube so deployed as to return the filtered oil directly back to the crankcase of the motor.

16. A liquid, rectifying process for catalyzing, neutralizing, electrostatically attracting, floccuating, coalescing, cohering, agglomerating, sedimentating, trapping, and finally removing or otherwise destroying the dispersed-phase from the continuous phase of a contaminated liquid dispersion particularly such a dispersion as lubricating oil in use in the motor, said dispersed-phase consisting both of soluable and insoluable contaminants such as sand, dirt, metal particles, carbon, acid, sulphur, gums, resins, ash, water, coolants, and other foreign materials of molecular and larger sizes, some of these being ionized and all being widely dispersed in said oil, said process selectively comprising:

(a) establishing an acute centrifugal motion in said oil to create inertial force for separating heavy contaminants, (b) exposing said oil to an assortment of certain metallic alloys to establish close contactual relationships therewith to neutralize acid, gums, resins, and sulphur or to catalyze such contaminants to render them harmless, (c) establishing a series of abrupt 180° reversals in the flow of said oil to dislodge heavy contaminants, (d) establishing laminar flow in a doughnut shaped circulating chamber to add dwell time and to help dislodge by the action of the lamina contained heavy contaminants, (e) exposing said circulating oil to large surface areas of various types of pure metal to catalyze or otherwise destroy certain contaminants, (f) exposing said oil with contaminants therein to large surface areas of selected metals in a very quiet flow to promote electrostatic attraction to said metals of said ionized contaminants, as well also as to facilitate the natural coalescence of said contaminants to the agglomerated contaminants on the surface of said large area metals, (g) increasing the dwell time in the flow of said oil to encourage sedimentation as well as the coalescence and bonding of unbalanced and polarized atoms of said contaminants by the Van der Waals effect, as well also the natural agglomerating of aggregating contaminants as a result of their contacting each other and cohering together, (h) and again affording the place and opportunity for these processes to continue while the oil is at rest being assisted by the Brownian movement in an environment where said contaminants are completely separated and removed from the oil stream where they can never recirculate.

(i) forcing oil through perforations in a series of concentric attractor baffles, setting up parabolic flow profiles in laminar action to assist in separating heavy contaminants from said flow stream and exposing the large surfaces of said baffles to a gentle flow of said oil encouraging coherence and electrostatic attraction of said ionically charged colloids, (j) passing said oil through a sand screen to finally remove any uncaptured large particles from the flow stream, (k) finally agglomerating said contaminants and separating said agglomerates by sedimentation through a honeycomb foraminous partition into said sump, (l) and draining said agglomerates through a valve from said sump for disposal.

References Cited
UNITED STATES PATENTS

| | | | |
|---|---|---|---|
| 2,207,399 | 7/1940 | Gaerther | 210—304 X |
| 3,450,264 | 6/1964 | Graybill | 210—304 X |

FRANK A. SPEAR, Jr., Primary Examiner

U.S. Cl. X.R.

210—84, 130, 187, 304, 512